United States Patent
Ku et al.

(10) Patent No.: US 8,085,757 B2
(45) Date of Patent: Dec. 27, 2011

(54) CALLER-CONTROLLED ROUTING TO NON-SIP/NON-TEL URI DESTINATIONS FOR AN IMS-BASED ENUM QUERY

(75) Inventors: Bernard Siu-Man Ku, Plano, TX (US); Mehrad Yasrebi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1295 days.

(21) Appl. No.: 11/268,670

(22) Filed: Nov. 7, 2005

(65) Prior Publication Data
US 2007/0104184 A1    May 10, 2007

(51) Int. Cl.
H04L 12/66    (2006.01)

(52) U.S. Cl. ........ 370/352; 370/353; 370/356; 370/392; 370/355; 379/220.01

(58) Field of Classification Search ............... 370/392, 370/352–353, 6; 709/203, 245, 227; 379/220.01
See application file for complete search history.

(56) References Cited

U.S. PATENT DOCUMENTS

| | | | |
|---|---|---|---|
| 5,950,632 A | 9/1999 | Reber et al. | |
| 6,081,827 A | 6/2000 | Reber et al. | |
| 6,138,151 A | 10/2000 | Reber et al. | |
| 6,775,269 B1 | 8/2004 | Kaczmarczyk et al. | |
| 6,788,676 B2 * | 9/2004 | Partanen et al. | 370/352 |
| 6,917,612 B2 | 7/2005 | Foti et al. | |
| 6,931,453 B2 | 8/2005 | Aarnos et al. | |
| 7,035,260 B1 * | 4/2006 | Betta et al. | 370/392 |
| 7,042,871 B2 * | 5/2006 | Gallant et al. | 370/352 |
| 2002/0027915 A1 | 3/2002 | Foti et al. | |
| 2002/0114282 A1 | 8/2002 | MeLampy et al. | |
| 2002/0137490 A1 | 9/2002 | Gallant | |
| 2002/0176404 A1 | 11/2002 | Girard | |
| 2004/0068584 A1 | 4/2004 | Costa-Requena et al. | |
| 2004/0143671 A1 | 7/2004 | Idnani | |
| 2004/0156394 A1 | 8/2004 | Westman | |
| 2004/0205241 A1 | 10/2004 | Aarnos et al. | |
| 2004/0215665 A1 * | 10/2004 | Edgar et al. | 707/200 |
| 2004/0246965 A1 | 12/2004 | Westman et al. | |
| 2005/0018659 A1 | 1/2005 | Gallant et al. | |

(Continued)

OTHER PUBLICATIONS

International Search Report and Written Opinion of the International Searching Authority for International Application No. PCT/US06/37625, mailed on Apr. 30, 2007.

*Primary Examiner* — Ian N Moore
*Assistant Examiner* — Khaled Kassim
(74) *Attorney, Agent, or Firm* — Toler Law Group

(57) ABSTRACT

A telephone number of the callee is received from a caller device. An Internet protocol Multimedia Subsystem (IMS)-based telephone number mapping (ENUM) query is constructed based on the telephone number of the callee. An ENUM database is queried based on the ENUM query. If a response to the ENUM query is absent a Session Initiation Protocol (SIP) Uniform Resource Indicator (URI) or a telephone (TEL) URI, the telephone number is resolved into one or more non-SIP/non-TEL URIs usable to communicate with the callee. The caller is enabled to use the caller device or other devices to select which of the one or more non-SIP/non-TEL URIs to use to communicate with the callee. For each caller-selected non-SIP/non-TEL URI, communication in a protocol associated with the URI is initiated between the caller and the callee using the caller device or other devices.

17 Claims, 4 Drawing Sheets

U.S. PATENT DOCUMENTS

2005/0208927 A1* 9/2005 Wong et al. ................ 455/412.1
2005/0286531 A1* 12/2005 Tuohino et al. ............ 370/395.2
2006/0077966 A1* 4/2006 Miyajima et al. ............. 370/352
2006/0168038 A1* 7/2006 Lin ............................... 709/206
2006/0262917 A1* 11/2006 Marsico ................... 379/220.01

* cited by examiner

CALLER-CONTROLLED ROUTING TO NON-SIP/NON-TEL URI DESTINATIONS FOR AN IMS-BASED ENUM QUERY

FIELD OF THE DISCLOSURE

The present disclosure relates to methods and systems for routing communications using an Internet protocol Multimedia Subsystem (IMS) network.

BACKGROUND

Voice over Internet Protocol (VOIP) telephony calls can be routed in an IMS network using a telephone number mapping (ENUM) database. FIG. 1 is a flow diagram of routing a voice call in an IMS network using ENUM. For purposes of illustration and example, the call is between a caller at a home network (HN) 10 and a callee at another HN 12. From user equipment 14, a caller dials an E.164 number of a callee. At step 200, the E.164 number is passed from the user equipment 14 to a Proxy Call Session Control Function (P-CSCF) 16 of the caller's HN 10. Based on the E.164 number, the P-CSCF 16 sends an invite (Request URI) message and passes it to a Serving-CSCF (S-CSCF) 20 of the caller's HN 10, at step 202. Moving to step 204, the S-CSCF 20 queries an ENUM database 22 of the caller's HN 10 to attempt to resolve the E.164 number to 'a Uniform Resource Indicator (URI).

Under desirable circumstances, at step 206, the ENUM database 22 will return a Session Initiation Protocol (SIP) URI or a telephone (TEL) URI to the S-CSCF 20 based on the query. Based on the SIP/TEL URI, at step 208, the S-CSCF 20 queries a Domain Name System (DNS) 24 of the caller's HN 10 to resolve a domain name of the URI to an Internet Protocol (IP) address. Proceeding to step 210, the DNS 24 returns the IP address of the URI domain to the S-CSCF 20. At step 212, the IP address is passed to an Interrogating-CSCF (I-CSCF) 26 of the callee's HN 12.

In a particular embodiment, using the IP address, the S-CSCF 20 of the caller's HN 10 sends a SIP INVITE request to the I-CSCF 26 of the callee's HN 12. At step 214, the I-CSCF 26 locates an S-CSCF 30 of the callee's HN 12, sends a SIP INVITE request to the S-CSCF 30. At step 116, the S-CSCF 30 passes the SIP invite request to a P-CSCF 32 of the callee's HN 12. At step 218, the P-CSCF 32 passes the SIP INVITE request to user equipment 34 of the callee.

In some circumstances, the ENUM database 22 may not return a SIP URI or a TEL URI in response to its being queried. In this case, the call is not routed using the IMS core but rather via a public switched telephone network (PSTN). Furthermore, if an entry for the E.164 number is not in the ENUM database, the caller is commonly routed to an announcement which indicates an error condition.

DETAILED DESCRIPTION OF THE DRAWINGS

IMS Voice over IP (VoIP) uses SIP URIs for voice communications. Unfortunately, if a SIP URI or a TEL URI is not returned in response to an ENUM/DNS query (e.g. as a result of a callee's preferences and/or the ENUM processing), IMS call processing does not continue.

Disclosed herein are embodiments of methods and systems that allow non-SIP/non-TEL URIs to be processed and connected to a callee who is an ENUM subscriber. Other URIs associated with the callee, such as email, Web, Instant Messaging, and presence URIs, can be used to reach the callee. One or more of the other URIs are selected by the caller and used to reach the callee with a specific service execution using a relevant protocol. The methods and systems for processing non-SIP/non-TEL URIs returned from an ENUM/DNS query make VoIP deployments more robust, and may improve overall caller and callee satisfaction.

Figure 1:
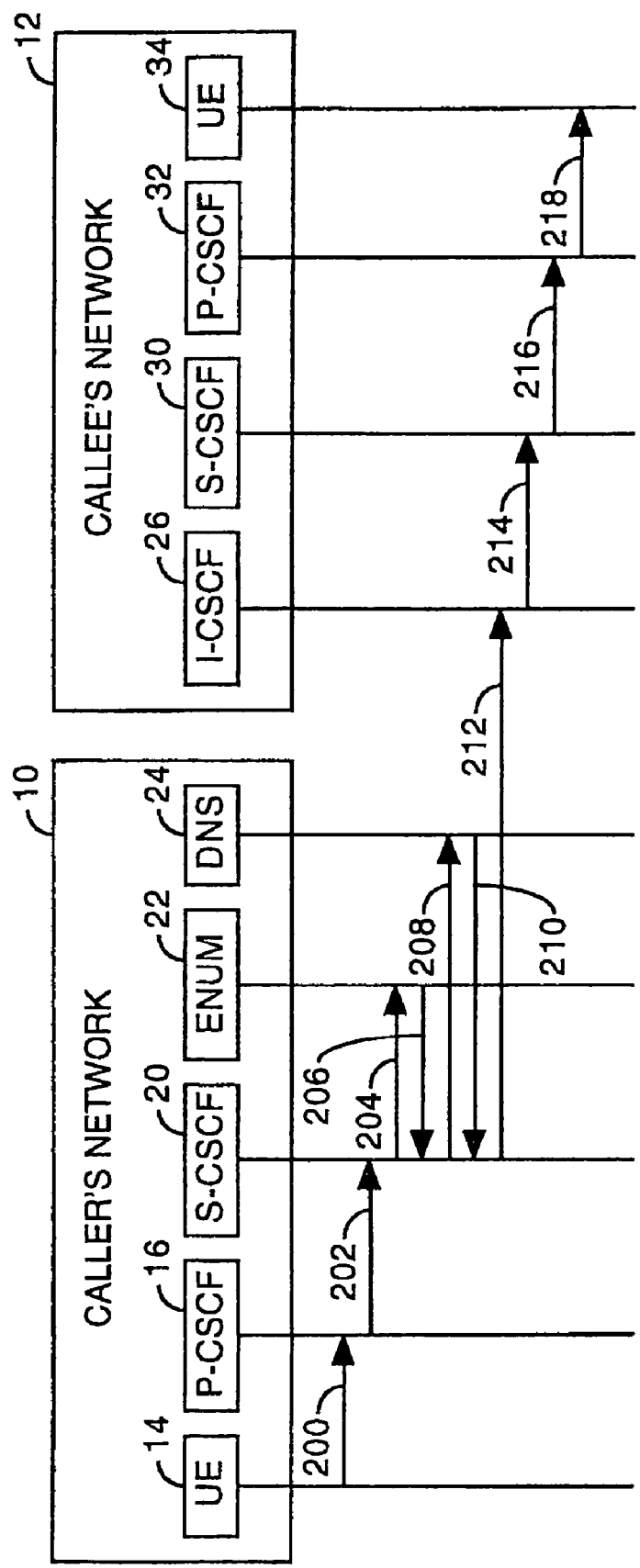
FIG. 1 (prior art) is a ladder diagram of routing a call in an IMS network using ENUM.
Figure 2:
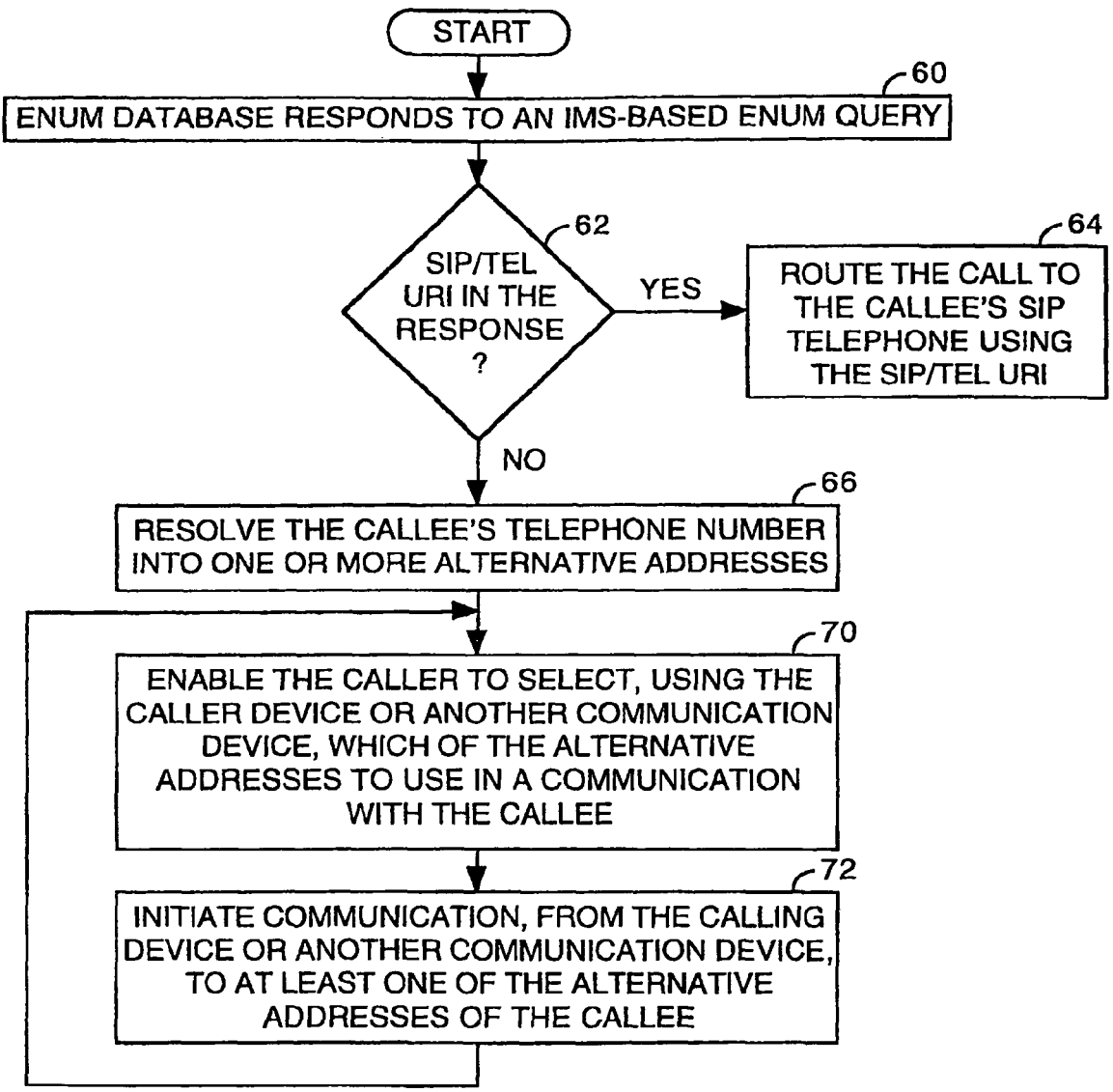
FIG. 2 is a flow chart of an embodiment of a method of routing both SIP URI and non-SIP/non-TEL URI communications based on an IMS-based ENUM query of an ENUM database.

FIG. 2 is a flow chart of an embodiment of a method of routing both SIP URI and non-SIP/non-TEL URI communications based on an IMS-based ENUM query of an ENUM database. The IMS-based ENUM query includes a telephone number, such as an E.164 number, of a callee as dialed by a caller using a calling device. The calling device may comprise an intelligent IP device that supports multiple protocols and functions either automatically and/or based on active requests by the caller. Examples of the protocols include, but are not limited to, an IP telephony protocol usable in VoIP communications, a Hypertext Transfer Protocol (HTTP) usable in Web communications, an instant messaging protocol usable to send and receive instant messages, an email protocol usable to send and receive email messages, a presence protocol, and a fax protocol usable to send and receive faxes.

A reverse ordering of digits in the telephone number, followed by ".e164.arpa", may be included in the IMS-based ENUM query. The IMS-based ENUM query is constructed by an IMS node in response to receiving a SIP request.

As indicated by block 60, the ENUM database responds to the IMS-based ENUM query by looking up the E.164 number to find any associated URIs. Any SIP/TEL URIs found in the ENUM database are included in a result list. The result list is communicated in a reply message to the IMS node.

As indicated by decision step 62, it is determined whether the response comprises a SIP URI or a TEL URI. A SIP URI may be prefixed by "sip:" in its protocol field. A TEL URI may be prefixed by "tel:" in its protocol field.

If the response comprises a SIP URI or a TEL URI, the call is routed to the callee's telephone using the SIP URI or the TEL URI, as indicated by block 64. Before routing the call, a query that includes a domain of the SIP/TEL URI is constructed. The query is made to a DNS which, in turn, returns an IP address which can be used to look for the callee. Based on the result from the DNS, the call is routed using a routing path allowed in the Internet Protocol network.

The SIP/TEL URI from the ENUM query may replace a previous TEL URI or SIP URI in the request URI. Routing of the SIP request may be based on a route header. When the route header is depleted, then a request URI IP address returned from a DNS is used at a Transmission Control Protocol/User Datagram Protocol (TCP/UDP) layer to route the message. The route header and the request URI are unchanged (i.e. not replaced with an IP address).

Returning to decision step 62, if the response is absent any SIP URI or TEL URI, the call cannot be routed in IMS. In this event, as indicated by block 66, an act of resolving the callee's telephone number into one or more alternative URIs is performed, e.g., by the calling device.

The calling device can resolve the callee's telephone number by accessing either a local database at the caller's premise or a network database at a remote location (e.g. in an IMS network). In an embodiment, the calling device accesses a database that stores one or more non-SIP and non-TEL ENUM records to resolve the callee's telephone number into alternative URI(s).

The resolved alternative URI(s) can be any of a variety of forms and extensions. Examples include, but are not limited to, an email address, an instant messaging address, and a Web page address. Email addresses may be prefixed by a protocol field comprising "mailto:". Instant messaging addresses may be prefixed by a protocol field comprising "im:". Web page addresses may be prefixed by a protocol field such as "http:". Presence addresses may be prefixed by a protocol field such as "pres:". Other existing and future URIs and other existing and future protocols are within the scope of this disclosure.

As indicated by block 70, the calling device receives a selection of which of the alternative URIs are to be used in subsequent communication(s) with the callee. The selection can be for one alternative address, more than one but less than all of the alternative addresses, or for all of the alternative addresses. In general, any subset of the alternative URIs can be selected.

In an embodiment, the calling device displays options from which the caller can independently select any of the alternative URIs. The calling device can present the alternative URIs to the caller either one-at-a-time or in a list. Consider the caller making a selection of at least one of the alternative URI(s).

As indicated by block 72, the method comprises initiating communications between the caller and the callee for the caller-selected alternative URI(s). Each communication uses a protocol associated with its respective caller-selected alternative URI. Each communication can be initiated by the calling device or another communication device other than the calling device.

The communications can be performed using pre-configured messages and/or live dynamic messages entered by the caller. The communications may comprise an email message, an instant message, Web browsing, a fax, or any combination thereof, for example. The communications can be initiated and performed using either the calling device or another communication device of the caller.

Thereafter, at least one subsequent communication between the caller and the callee can be initiated for at least one other caller-selected non-SIP/non-TEL URI for the callee. Each subsequent communication uses a protocol associated with its respective caller-selected non-SIP/non-TEL URI. Any protocol used in each of these subsequent communications may be the same or may differ from a protocol used in a previously-initiated communication between the caller and the callee.

The caller may attempt a subsequent communication for various reasons. For example, the caller may attempt a subsequent communication if a previously-initiated communication causes an error message. As another example, the caller may attempt the subsequent communication to communicate to the callee in multiple modes.

In this way, the caller can make a real-time decision of which available protocol/alternative URts to use to communicate with the callee. Further, the caller can make real-time decision(s) to control the order that multiple alternative URIs are used to communicate with the callee. Thus, the resolution and choice of how the call proceeds is entirely controlled by the caller.

Figure 3:
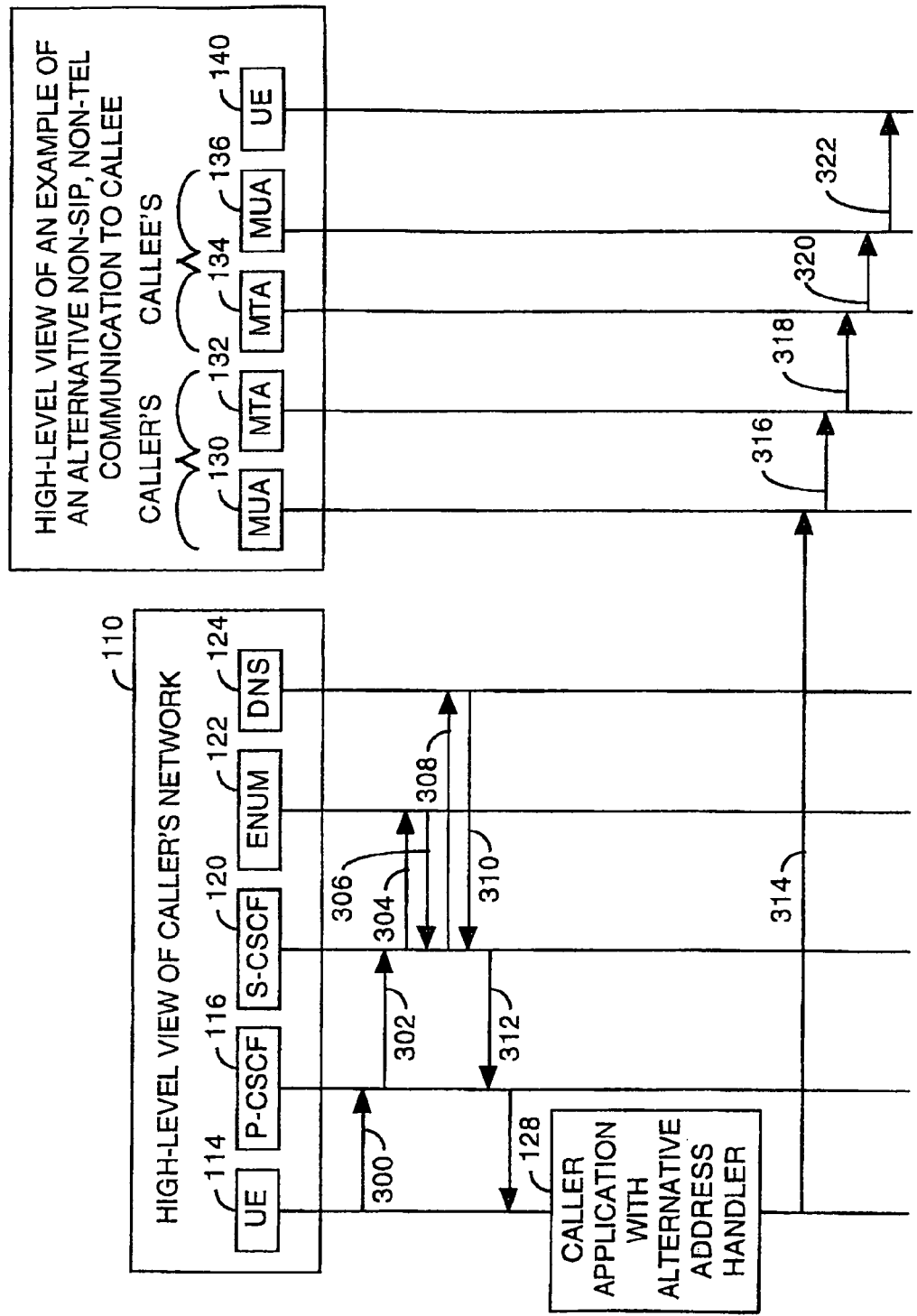
FIG. 3 is a ladder diagram of an embodiment of a method of facilitating an email communication based on an IMS-based query of an ENUM database which returns a non-SIP/non-TEL result.

For purposes of illustration and example, consider a scenario where a caller dials an E.164 telephone number, and is presented an alternative mode of communication that includes e-mail to the callee. FIG. 3 is a ladder diagram of an embodiment of a method of providing this functionality in an IMS network, such as an IMS HN 110, using ENUM.

From user equipment (UE) 114, a caller dials an E.164 number of a callee. At step 300, the E.164 number is passed from the user equipment 114 to a Proxy Call Session Control Function (P-CSCF) 116 of the IMS HN 110. At step 302, based on the E.164 number, the P-CSCF 116 sends an invite (Request URI) message and passes it to a Serving-CSCF (S-CSCF) 120 of the IMS HN 110. The S-CSCF 120 queries an ENUM database 122 of the IMS HN 110 to attempt to resolve the E.164 number to a Uniform Resource Indicator (URI) at step 304.

Proceeding to step 306, the ENUM database 122 returns a non-SIP/non-TEL URI to the S-CSCF 120 based on the query. Based on the non-SIP/non-TEL URI, at step 308, the S-CSCF 120 queries a Domain Name System .(DNS) 124 of the IMS HN 110 to resolve a domain name of the non-SIP/non-TEL URI to an Internet Protocol (IP) address. At step 310, the DNS 124 returns the IP address of the non-SIP/non-TEL URI domain, rather than an unresolved message (e.g. a not-found message), to the S-CSCF 120. The IP address is an alternative address for an alternative communication server of the callee.

At step 312, the S-CSCF 120 of the caller's HN 110 forwards the alternative address, and potentially one or more other alternative addresses of the callee, to the UE 114 of the caller. The UE 114 comprises a caller application 128 that processes the alternative addresses. Multiple alternative URIs can be obtained either by iteratively retrieving the alternative URIs from the ENUM engine or by retrieving all alternative URIs at once. The caller application 128 uses the protocol field of the alternative URIs to determine each alternative application protocol that is available for communications. The various alternatives are made available at the UE 114. For example, the UE 114 or another device can display the various alternatives and make the various alternatives caller-selectable. Based on a selection of one or more of the alternatives, the caller initiates one or more alternative forms of communication (e.g. email, IM, fax, Web or presence) to the callee. The one or more alternative forms of communication can be performed using the UE 114 or another device of the caller.

For purposes of illustration and example, consider the alternatives including an email option, and consider the caller selecting the email option using the UE 114 as abstracted in FIG. 3. Based on the selection of the email option at step 314, the caller uses the UE 114 to initiate sending an email message to his/her Mail User Agent (MUA) 130. This may comprise the caller dynamically composing contents of the email message using the UE 114 or the UE 114 retrieving a pre-composed content for the email message.

Continuing to step 316, the caller's MUA 130 forwards the email message to its Mail Transfer Agent (MTA) 132. At step 318, the caller's MTA 132, in turn, forwards the email message to the callee's MTA 134. Moreover, at step 320, the callee's MTA 134, in turn, forwards the email message to the callee's Mail User Agent (MUA) 136. At step 322, the callee's MUA 136, in turn, delivers the email message to the callee's UE 140. The callee's UE 140 displays the email message to the callee.

If the caller application 128 receives an error message after attempting to send the email message, the caller application 128 can use any additional non-SIP/non-TEL URIs to send a message to the callee. In this case, the caller application 128 can automatically retrieve the additional non-SIP/non-TEL URIs by retrying an ENUM query to the ENUM engine. The caller application 128 can attempt to communicate with the callee using a different alternative address. The process of retrieving an additional URI and attempting communication using the additional URI can be repeated until communication is successful or until no more additional URIs exist for the callee.

Although illustrated above for an email protocol, those having ordinary skill can appreciate how the disclosure with reference to FIG. 3 can be adapted for other protocols. These adaptations include appropriate components for other communication mechanisms for the other protocols. Further, those having ordinary skill can appreciate that the functionality depicted in the home network 110 can be implemented using other IMS elements. Still further, those having ordinary skill can appreciate that lower level entities are not necessarily shown in FIG. 3.

Figure 4:
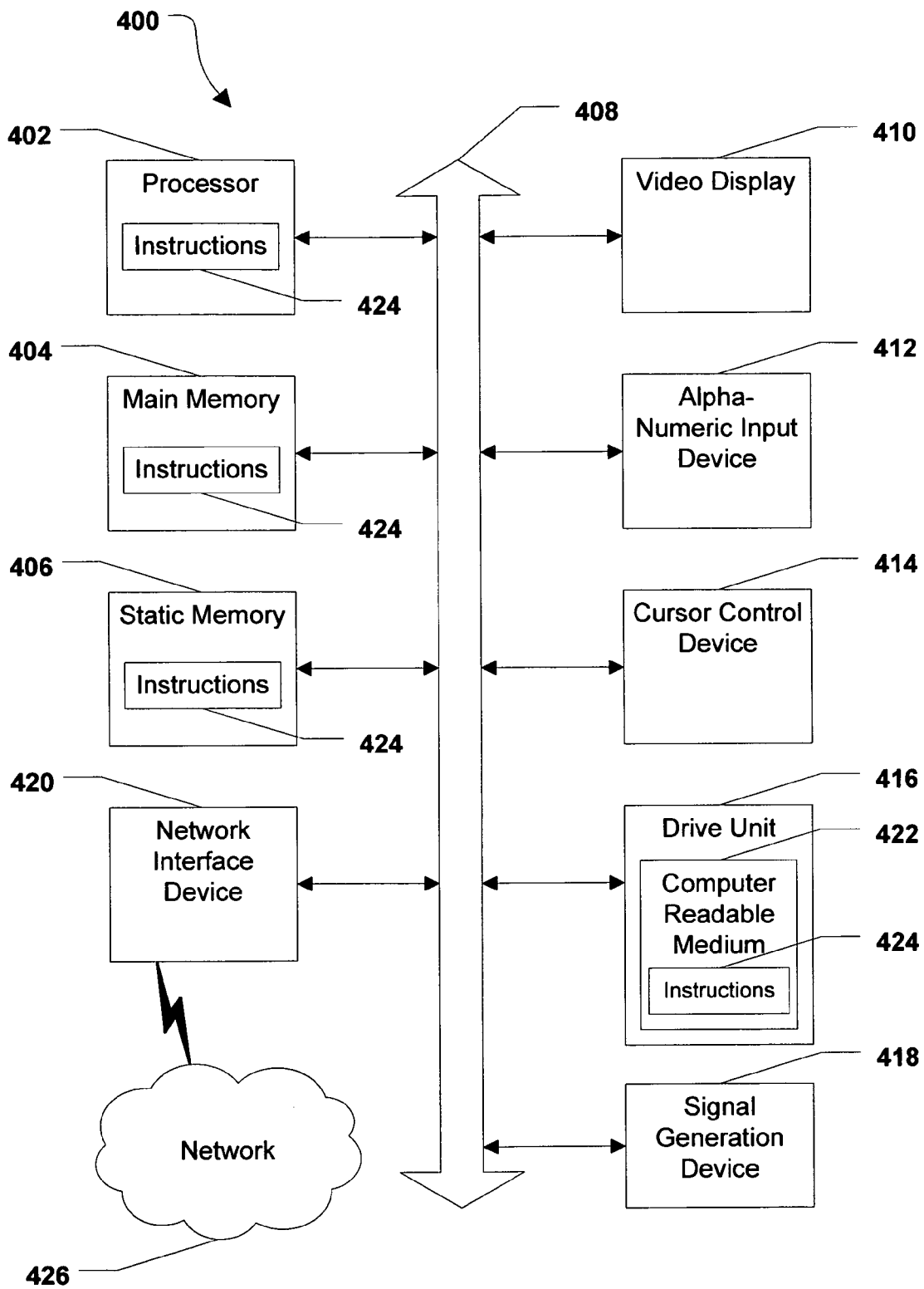
FIG. 4 is a diagram of one embodiment of a general computer system.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406, that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving a telephone number of a callee at a caller device of a caller;
   constructing an internet protocol multimedia subsystem-based telephone number mapping query based on the telephone number of the callee;
   performing the internet protocol multimedia subsystem-based telephone number mapping query with respect to a telephone number mapping database and receiving a response based on the internet protocol multimedia subsystem-based telephone number mapping query;
   determining whether the response includes one of a session initiation protocol uniform resource indicator and a telephone uniform resource indicator associated with the telephone number of the callee; and
   when the response does not include one of the session initiation protocol uniform resource indicator and the telephone uniform resource indicator:
      accessing a local database stored at the caller device to resolve the telephone number into one or more non-session initiation protocol/non-telephone uniform resource indicators usable to communicate with the callee;
      displaying, at the caller device, a selectable list of the one or more non-session initiation protocol/non-telephone uniform resource indicators to the caller;
      receiving, at the caller device, a selection of a particular non-session initiation protocol/non-telephone uniform resource indicator of the one or more non-session initiation protocol/non-telephone uniform resource indicators from the selectable list;
      initiating, in response to the selection of the particular non-session initiation protocol/non-telephone uniform resource indicator at the caller device, a communication from the caller device for the particular non-session initiation protocol/non-telephone uniform resource indicator using a first protocol associated with the particular non-session initiation protocol/non-telephone uniform resource indicator;
      receiving, at the caller device, a first indication that the communication was not delivered; and
      automatically, in response to receiving the first indication that the communication was not delivered, successively initiating communications from the caller device for at least one non-session initiation protocol/non-telephone uniform resource indicator of the one or more non-session initiation protocol/non-telephone uniform resource indicators included in the selectable list, wherein the communications are successively initiated until a second indication is received that at least one of the communications was delivered.

2. The method of claim 1, further comprising initiating at least one other communication from the caller device for at least one other non-session initiation protocol/non-telephone uniform resource indicator selected from the selectable list, wherein the at least one other communication uses the second protocol associated with the at least one other non-session initiation protocol/non-telephone uniform resource indicator.

3. The method of claim 1, wherein resolving the telephone number comprises repeatedly accessing the local database, wherein each accessing of the local database returns one of the one or more non-session initiation protocol/non-telephone uniform resource indicators.

4. The method of claim 3, further comprising providing a telephone number mapping engine to access the local database, the telephone number mapping engine providing a different one of the one or more non-session initiation protocol/non-telephone uniform resource indicators during each access of the local database.

5. The method of claim 1, wherein the first indication includes an error message.

6. The method of claim 5, wherein the first protocol associated with the particular non-session initiation protocol/non-telephone uniform resource indicator differs from a third protocol associated with the at least one other non-session initiation protocol/non-telephone uniform resource indicator.

7. The method of claim 1, wherein the one or more non-session initiation protocol/non-telephone uniform resource indicators include at least one of an email uniform resource indicator, an instant messaging uniform resource indicator, a web uniform resource indicator, and a presence uniform resource indicator.

8. A method comprising:
receiving a telephone number of a callee at a caller device of a caller, the caller device having an interactive caller application capable of communicating in a plurality of different protocols including a voice over internet protocol;
passing the telephone number to a first call session control function;
sending an invite message from the first call session control function to a second call session control function;
querying a telephone number mapping database, by the second call session control function, to attempt to resolve the telephone number to a uniform resource indicator;
receiving, by the second call session control function, one or more non-session initiation protocol/non-telephone uniform resource indicators based on querying the telephone number mapping database;
querying a domain name system, by the second call session control function, to resolve a domain name of the one or more non-session initiation protocol/non-telephone uniform resource indicators to one or more internet protocol addresses;
forwarding the one or more internet protocol addresses from the second call session control function to the caller device to display, at the caller device, a selectable list of the one or more internet protocol addresses to the caller;
receiving, at the caller device, a selection of a particular internet protocol address from the one or more internet protocol addresses from the selectable list;
retrieving a pre-configured message associated with the particular internet protocol address;
sending, in response to the selection of the particular internet protocol address at the caller device, the pre-configured message from the caller device to the particular internet protocol address using a protocol associated with the particular internet protocol address;
receiving, at the caller device, a first indication that the pre-configured message was not delivered; and
automatically, in response to receiving the first indication that the pre-configured message was not delivered, successively initiating communications from the caller device for at least one internet protocol address of the one or more internet protocol addresses included in the selectable list, wherein the communications are successively initiated until a second indication is received that at least one of the communications was delivered.

9. The method of claim 8, wherein the first call session control function comprises a proxy call session control function and the second call session control function comprises a serving call session control function.

10. The method of claim 8, wherein the particular internet protocol address is associated with an email protocol, and wherein the pre-configured message comprises a pre-configured email message.

11. The method of claim 10, further comprising:
sending the pre-configured email message from the caller device to a mail user agent of the caller;
forwarding the pre-configured email message from the mail user agent to a first mail transfer agent of the caller;
forwarding the pre-configured email message from the first mail transfer agent to a second mail transfer agent of the callee;
forwarding the pre-configured email message from the second mail transfer agent to a second mail user agent of the callee; and
delivering the pre-configured email message from the second mail user agent to the callee.

12. The method of claim 8, wherein the telephone number is an E.164 number.

13. The method of claim 8, wherein the one or more non-session initiation protocol/non-telephone uniform resource indicators include at least one of an email uniform resource indicator, an instant messaging uniform resource indicator, a web uniform resource indicator, and a presence uniform resource indicator.

14. The method of claim 1, wherein the communications include a second communication using a fourth protocol associated with a second non-session initiation protocol/non-telephone uniform resource indicator of the one or more non-session initiation protocol/non-telephone uniform resource indicators.

15. The method of claim 1, further comprising automatically initiating the communication from the caller device for each of the one or more non-session initiation protocol/non-telephone uniform resource indicators included in the selectable list in response to receiving the first indication that the communication was not delivered.

16. The method of claim 1, wherein the initiated communication includes a dynamic message entered by the caller, wherein the dynamic message includes at least one of an email message, an instant message, web browsing, a fax, and a text message.

17. The method of claim 1, further comprising:
receiving, at the caller device, a selection of a subset of at least two non-session initiation protocol/non-telephone uniform resource indicators of the one or more non-session initiation protocol/non-telephone uniform resource indicators from the selectable list; and
in response to the selection of the subset of the at least two non-session initiation protocol/non-telephone uniform resource indicators, initiating, at the caller device, a pre-configured communication from the caller device for each non-session initiation protocol/non-telephone uniform resource indicator of the subset of the at least two non-session initiation protocol/non-telephone uniform resource indicators.

* * * * *